(12) United States Patent
Ortiz et al.

(10) Patent No.: US 8,769,315 B1
(45) Date of Patent: Jul. 1, 2014

(54) POWER MANAGING ENERGY-HARVESTING FOR SELECTIVELY CONTROLLING A STATE OF INDIVIDUAL COMPUTER BASED ON A HARVESTING ENERGY STORED AVAILABLE

(75) Inventors: Albert Ortiz, Chalfont, PA (US); Donald D. Dalessandro, Williamstown, NJ (US); Qing Dong, Birdsboro, PA (US); John K. Overby, Hanover, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 382 days.

(21) Appl. No.: 13/172,185

(22) Filed: Jun. 29, 2011

Related U.S. Application Data

(60) Provisional application No. 61/388,480, filed on Sep. 30, 2010.

(51) Int. Cl.
  *G06F 1/26* (2006.01)
  *G06F 1/32* (2006.01)
  *G06F 1/00* (2006.01)

(52) U.S. Cl.
  USPC .......................... 713/300; 713/320; 713/324

(58) Field of Classification Search
  USPC ......................................... 713/300, 320, 324
  See application file for complete search history.

(56) References Cited

U.S. PATENT DOCUMENTS

| | | | |
|---|---|---|---|
| 6,778,099 B1 * | 8/2004 | Meyer et al. | 340/870.02 |
| 6,782,345 B1 * | 8/2004 | Siegel et al. | 702/183 |
| 7,081,693 B2 | 7/2006 | Hamel et al. | |
| 7,256,505 B2 | 8/2007 | Arms et al. | |
| 7,400,253 B2 | 7/2008 | Cohen | |
| 7,429,805 B2 | 9/2008 | Hamel et al. | |
| 7,719,416 B2 | 5/2010 | Arms et al. | |
| 7,764,958 B2 | 7/2010 | Townsend et al. | |
| 2001/0037168 A1 * | 11/2001 | Hozuka et al. | 701/29 |
| 2004/0088601 A1 * | 5/2004 | Shah et al. | 714/15 |
| 2005/0289290 A1 * | 12/2005 | Chen et al. | 711/103 |

(Continued)

OTHER PUBLICATIONS

U.S. Appl. No. 61/388,480, filed Sep. 30, 2010, inventors Albert Ortiz, Donald D. Dalessandro, Qing Dong, and John K. Overby, invention title "Power-Managing Energy-Harvesting Sensor Node for Situationally Aware Wireless Networking".

(Continued)

*Primary Examiner* — Thomas Lee
*Assistant Examiner* — Phil Nguyen
(74) *Attorney, Agent, or Firm* — Howard Kaiser

(57) ABSTRACT

According to typical inventive practice, each inventive sensor node performs computer processing that is tri-chotomized in a progressive, power-regulating scheme of three processors, namely, a low-performance processor, a middle-performance processor (which remains in sleep mode until activated upon demand for a middle-computation function), and a high-performance processor (which remains in sleep mode until activated upon demand for a high-computation function). The low-performance processor performs low computation functions such as routine sensing functions. The middle-performance processor performs middle-computation functions such as validative sensing functions. The high-performance processor performs high computation functions such as remedial communicative functions. Each sensor node has one or more transceivers for wirelessly transmitting and receiving radio signals (e.g. remedial communication) to and from transceivers of other sensor nodes. Some transceivers may be specifically dedicated to wirelessly communicating "wake-up" signals among nodes. Inventive practice is notably efficacious in furtherance of situational awareness of damage events onboard naval ships.

6 Claims, 3 Drawing Sheets

(56) References Cited

U.S. PATENT DOCUMENTS

| | | | |
|---|---|---|---|
| 2007/0063833 A1* | 3/2007 | Kates | 340/521 |
| 2007/0132554 A1* | 6/2007 | Anderson | 340/5.72 |
| 2008/0082845 A1* | 4/2008 | Morisawa | 713/323 |
| 2009/0183018 A1* | 7/2009 | Nakamura et al. | 713/323 |
| 2011/0208324 A1* | 8/2011 | Fukatsu | 700/7 |

OTHER PUBLICATIONS

U.S. Appl. No. 61/386,077, filed Sep. 24, 2010, inventors Qing Dong, Albert Ortiz, Donald D. Dalessandro, and David J. Kocsik, invention title "Active-Avoidance-Based Routing in a Wireless Ad Hoc Network".

U.S. Appl. No. 13/172,137, filed Jun. 29, 2011, inventors Qing Dong, Albert Ortiz, Donald D. Dalessandro, and David J. Kocsik, invention title "Active-Avoidance-Based Routing in a Wireless Ad Hoc Network".

U.S. Appl. No. 13/161,652, filed Jun. 16, 2011 invention title "Wireless Electric Power Transmission Through Wall," inventors Albert Ortiz, Donald D. Dalessandro, John M. Roach, Donald R. Longo, and Qing Dong.

Ortiz et al., "Energy Harvester Power Management for Wireless Sensor Networks," ASNE Proceedings, Automation and Controls Symposium, Dec. 10-11, 2007, Biloxi, Mississippi (9 pages).

Steven W. Arms et al., "Energy Harvesting Wireless Sensors for Helicopter Damage Tracking," Proceedings of AHS International Forum 62, HUMS III session, Phoenix, AZ, May 11, 2006 (6 pages).

Steven W. Arms et al., "Harvesting Power from Multiple Energy Sources for Wireless Sensors," Presented to Sensors Expo, Rosemont, IL, Jun. 7, 2010 (52 pages).

Steven W. Arms et al., "Power Management for Energy Harvesting Wirelss Sensors," SPIE International Symposium on Smart Structures and Smart Materials, Mar. 9, 2005, San Diego, CA (9 pages).

Steven W. Arms et al., Wireless Strain Sensing Networks, 2nd European Workshp on Structural Health Monitoring, Munich, Germany, Jul. 7-9, 2004 (9 pages).

Benton H. Calhoun et al., "Design Considerations for Ultra-Low Energy Wireless Microsensor Nodes," IEEE Transactions on Computers, vol. 54, No. 6, Jun. 2005, pp. 727-740.

D.L. Churchill et al., "Strain Energy Harvetsing for Wireless Sensor Networks," Smart Structures and Materials 2003, MEMS, BioMEMS, and Nanotechnology, Vijay K. Varadan et al, Editors, Proceedings of SPIE vol. 5055, 2003, p. 319-327.

Gilbert et al., "Comparison of Energy Harvesting Systems for Wireless Sensor Networks," International Journal of Automation and Computing, vol. 5, No. 4, Oct. 2008, pp. 334-347.

Rex Min et al., MIT, "Energy-Centric Enabling Technologies for Wireless Sensor Networks," Energy-Aware Ad Hoc Wireless Networks, IEEE Wireless Communications, Aug. 2002, pp. 28-39.

Rex Min et al., MIT, "Low-Power Wireless Sensor Networks," Fourteenth International Conference of VLSI Design 2001, Bangalore, India, Jan. 3-7, 2001 (6, pages).

G.J. Pottie and W.J. Kaiser, "Wireless Integrated Network Sensors," Communications of the ACM, vol. 43, No. 5, May 2000, pp. 51-58.

Winston K.G. Seah et al., "Wireless Sensor Networks Powered by Ambient Energy Harvesting (WSN-HEAP)—Survey and Challenges," Wireless VITAE 2009, 1st International Conference, May 17-20, 2009 (5 pages).

Amit Sinha and Anantha Chandrakasan, "Dynamic Power Management in Wireless Sensor Networks," Wireless Power Management, IEEE Design and Test of Computers, Mar.-Apr. 2001, pp. 62-74.

R. Torah et al., "Self-Powered Autonomous Wireless Sensor Node Using Vibration Energy Harvesting," Measurement Science and Technology, vol. 19, IOP Publishing Ltd., UK, 2008 (8 pages).

Marcos Augusto M. Vieira et al., "Survey on Wireless Sensor Network Devices," Proceedings of the 9th IEEE International Conference on Emerging Technologies and Factory Automation (ETFA 2003), Sep. 16-19, 2003, Lisbon, Portugal,vol. 1, pp. 537-544.

* cited by examiner

POWER MANAGING ENERGY-HARVESTING FOR SELECTIVELY CONTROLLING A STATE OF INDIVIDUAL COMPUTER BASED ON A HARVESTING ENERGY STORED AVAILABLE

CROSS-REFERENCE TO RELATED APPLICATIONS

This application claims the benefit of U.S. provisional application No. 61/388,480, filing date 30 Sep. 2010, hereby incorporated herein by reference, invention title "Power-Managing Energy-Harvesting Sensor Node for Situationally Aware Wireless Networking," joint inventors Albert Ortiz, Donald D. Dalessandro, Qing Dong, and John K. Overby.

BACKGROUND OF THE INVENTION

The present invention relates to wireless communications, more particularly to power management of sensor nodes of a wireless sensor network.

The United States Navy uses sensors (detectors) to maintain situational awareness in association with shipboard electromechanical systems such as machinery automation and control systems. Sensors useful for such purposes include position sensors, temperature sensors, chemical compound sensors, infrared (IR) sensors, image spectrum analyzers, etc. Networking of sensors has traditionally involved wiring—i.e., wired powering of sensors, and wired communication between sensors. Wireless networking of sensors is being considered and developed by the Navy because of beneficial prospects of distribution, decentralization, survivability, and reconfigurability as pertain to machinery automation and control for ship operations.

Power can be supplied to a sensor via conventional approaches such as wiring (e.g., shipboard wiring) from a power source (direct current or alternating current), or close association of a direct current power supply with (e.g., embedment of one or more batteries in) the sensor. Cumbersome, proliferative wiring is often undesirable or impractical. Direct current power sources such as batteries run out of power and require replacement or continual recharging.

It is known generally that energy can be harvested from ambient sources such as light (electromagnetism), sound, vibration, heat, etc. A solar cell, for instance, is a common type of energy harvester. Recent literature has disclosed management of power consumption in wireless systems, such as through energy (power) harvesting, and/or power reduction (e.g., "sleep mode") under prescribed circumstances. Some energy harvesting technologies require communication devices to periodically sleep in duty cycles so that energy can be harvested and stored. Due to the variability of environmental energy sources for harvesting, energy harvesting technology may provide a very low duty cycle with an event-triggered interrupt function. See, e.g., the following United States patents: Townsend et al. U.S. Pat. No. 7,764,958 B2, Arms et al. U.S. Pat. No. 7,719,416 B2, Hamel et al. U.S. Pat. No. 7,429,805 B2, Cohen U.S. Pat. No. 7,400,253 B2, Arms et al. U.S. Pat. No. 7,256,505 B2, Hamel et al. U.S. Pat. No. 7,081,693 B2, incorporated herein by reference. See also, Ortiz et al., "Energy Harvester Power Management for Wireless Sensor Networks," ASNE Proceedings, Automation and Controls Symposium, 10-11 Dec. 2007, Biloxi, Miss., incorporated herein by reference.

While energy harvesting appears to represent a piece of the puzzle, there is plenty of room for improvement for implementing energy harvesting in the context of a wireless sensor network so as to supply power to each sensor node in an economical, sustainable, and feasible manner.

SUMMARY OF THE INVENTION

In view of the foregoing, it is an object of the present invention to provide an improved methodology for managing power supplied to each sensor device in a wireless network of sensor.

The present invention, as typically embodied, provides a sensor unit that is autonomous in terms of functions including sensing, processing, and communicating (e.g., with other sensors), and in terms of powering of such functions. Inventive embodiments include sensing-communicating devices, systems of sensing-communicating devices, methods for sensing and communicating, computer programs products for performing such methods, and computer systems having such computer program products resident in memory.

The present invention may be embodied, for example, as an independent sensor for a survivable machinery automation and control system such as may be found onboard naval ships. A typical inventive embodiment is powered by an array of energy power harvesters and/or power storage devices, and effects a novel power management strategy to minimize power consumption during sensing, computation, and wireless communication. The inventive sensor is an integral device that harvests power, stores power, and judicially manages power consumption. An inventive sensor device can be embodied to synthesize an array of varied energy power harvesting sources so as to supply optimal low-power levels of required electrical power.

Energy can be harvested locally from vibration, light, acoustic, thermal, and/or other sources. All of the harvested energy can be combined utilizing an energy storage device for low duty-cycle sensor operation. A typical embodiment of the present invention's independent sensor can be used for machinery automation and control to perform the functions of sensing, computation, power management, and wireless communication as a self-powered unit, without reliance on external power supplied via cable/wires. The present invention provides (for instance, for machinery automation and control) a sensor that is "wireless" in the truest sense of the word. Inventive practice integrates low power hardware, energy harvesting and storage, and a power management scheme into a single independent sensing unit. That is, the present invention's power management methodology integrates elements including the following into a single independent sensing unit: low power sensing; low power radio frequency (RF) wireless transceiving; energy harvesting; energy storage; and, a power consumption management strategy, such as involving scheduling and event-driven activity.

Typically according to the inventive power management methodology, the computer processing is "tri-chotomized," in a "stepped" regime, into computer processing components including the following: (i) a low-performance processor, for processing of routine sensing; if the low-performance processor's routine sensing detects an extraordinary circumstance), (ii) a middle-performance processor, for processing of "validative" sensing; and, if the middle-performance processor validates the extraordinary circumstance), (iii) a high-performance processor, for processing of high-computational functions such as wireless routing and information.

Among possible applications of the present invention are those affording capabilities of continuous sensing and situational awareness before, during and after a damage event, such as may take place onboard a naval ship. Of interest in this regard, and incorporated herein by reference, is U.S. provisional patent application Ser. No. 61/386,077, filing date 24 Sep. 2010, listed inventors Qing Dong, Albert Ortiz, Donald D. Dalessandro, and David J. Kocsik, invention title "Active-Avoidance-Based Routing in a Wireless Ad Hoc Network." Dong et al. '077 disclose a novel wireless routing algorithm that successfully routes communication when a destructive event takes place and is rapidly expanding in area, which are circumstances under which a conventional wireless routing algorithm will likely fail.

According to frequent practice of the present invention, prior to a damage event, the present invention's independent sensor unit provides routine sensory information to the undamaged ship machinery automation and control network. During and after the damage event, the present invention's independent sensor unit continues to provide sensing data (provided that the present invention's independent sensor unit is undamaged) in the main damage area, notwithstanding disruption or termination of power and communication. Using local harvested power, the present invention's independent sensor unit retains the ability, in the context of an ad hoc wireless network, to communicate to a different (e.g., the closest) operational node on the control network, thereby providing the important/necessary sensor information.

Of some interest herein is co-pending U.S. patent application Ser. No. 13/161,652, filing date 16 Jun. 2011, incorporated herein by reference, invention title "Wireless Electric Power Transmission Through Wall," joint inventors Albert Ortiz, Donald D. Dalessandro, John M. Roach, Donald R. Longo, and Qing Dong.

BRIEF DESCRIPTION OF THE DRAWINGS

In order that the present invention may be clearly understood, it will now be described, by way of example, with reference to the accompanying drawings, wherein.

DETAILED DESCRIPTION OF THE INVENTION

Figure 1:
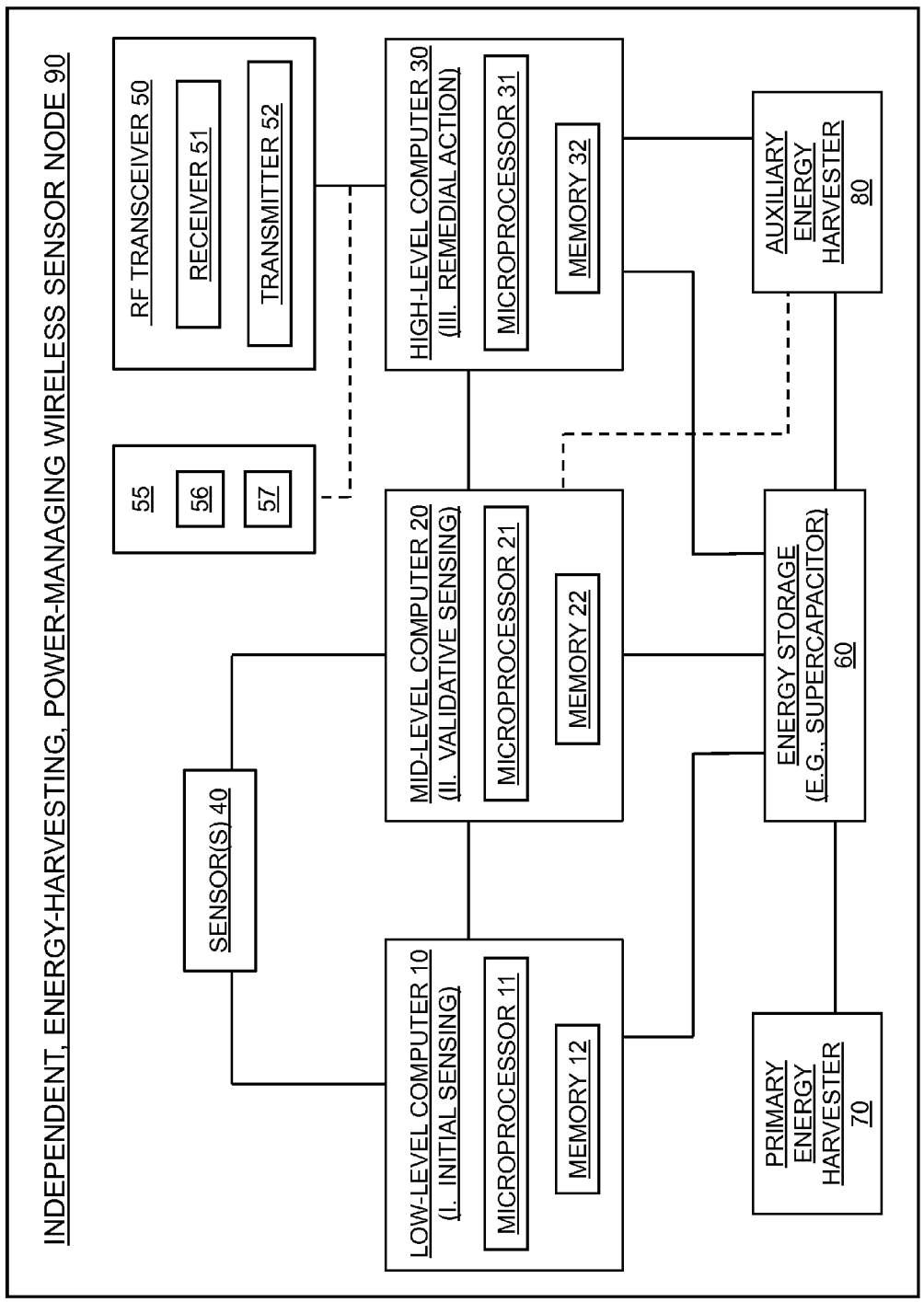
FIG. 1 is a schematic diagram of an embodiment of an independent, energy-harvesting, power-managing wireless sensor unit in accordance with the present invention.
Figure 2:
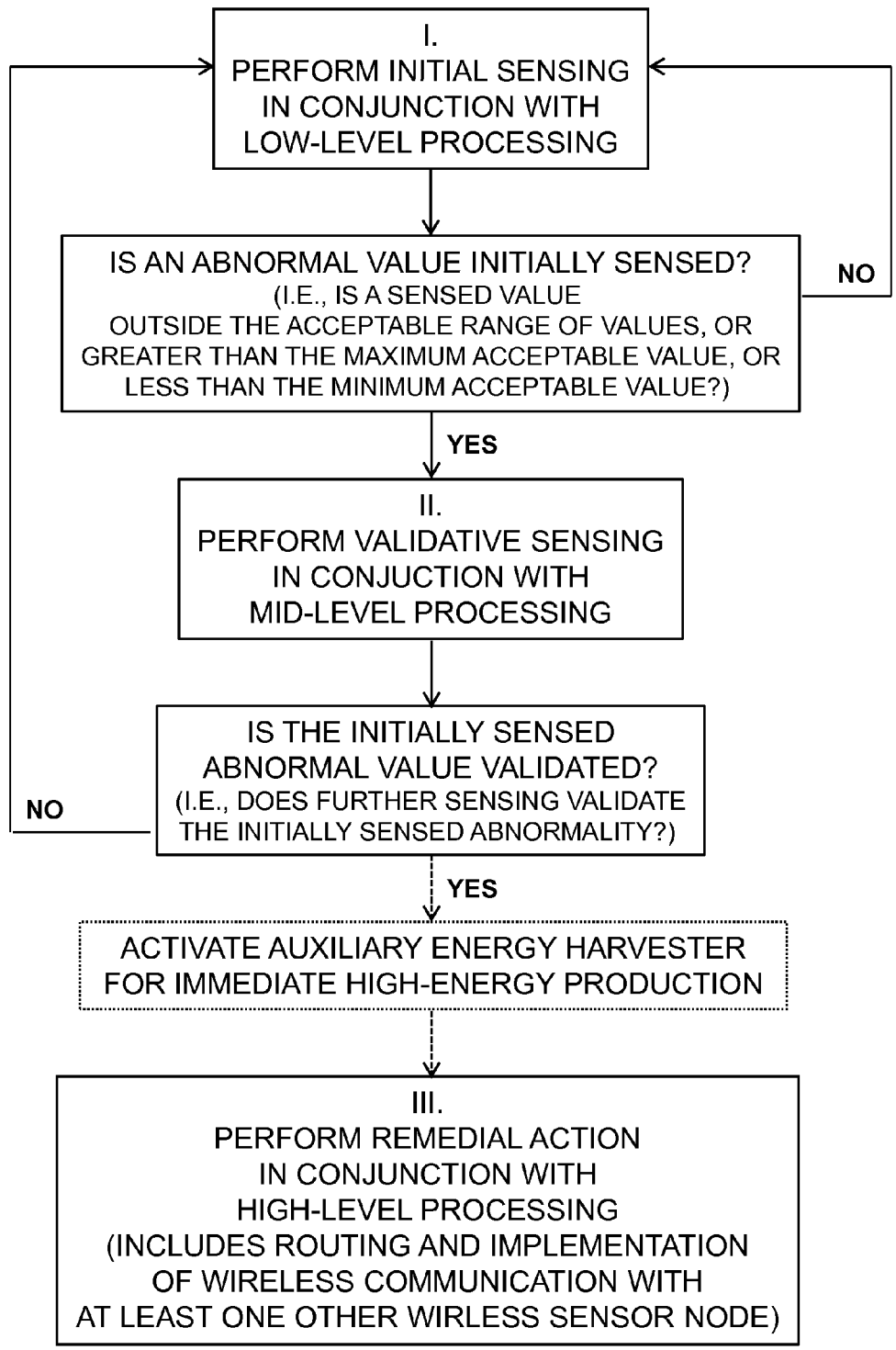
FIG. 2 is a flow diagram of an embodiment of stepped tri-processing computer logic in accordance with the present invention.
Figure 3:
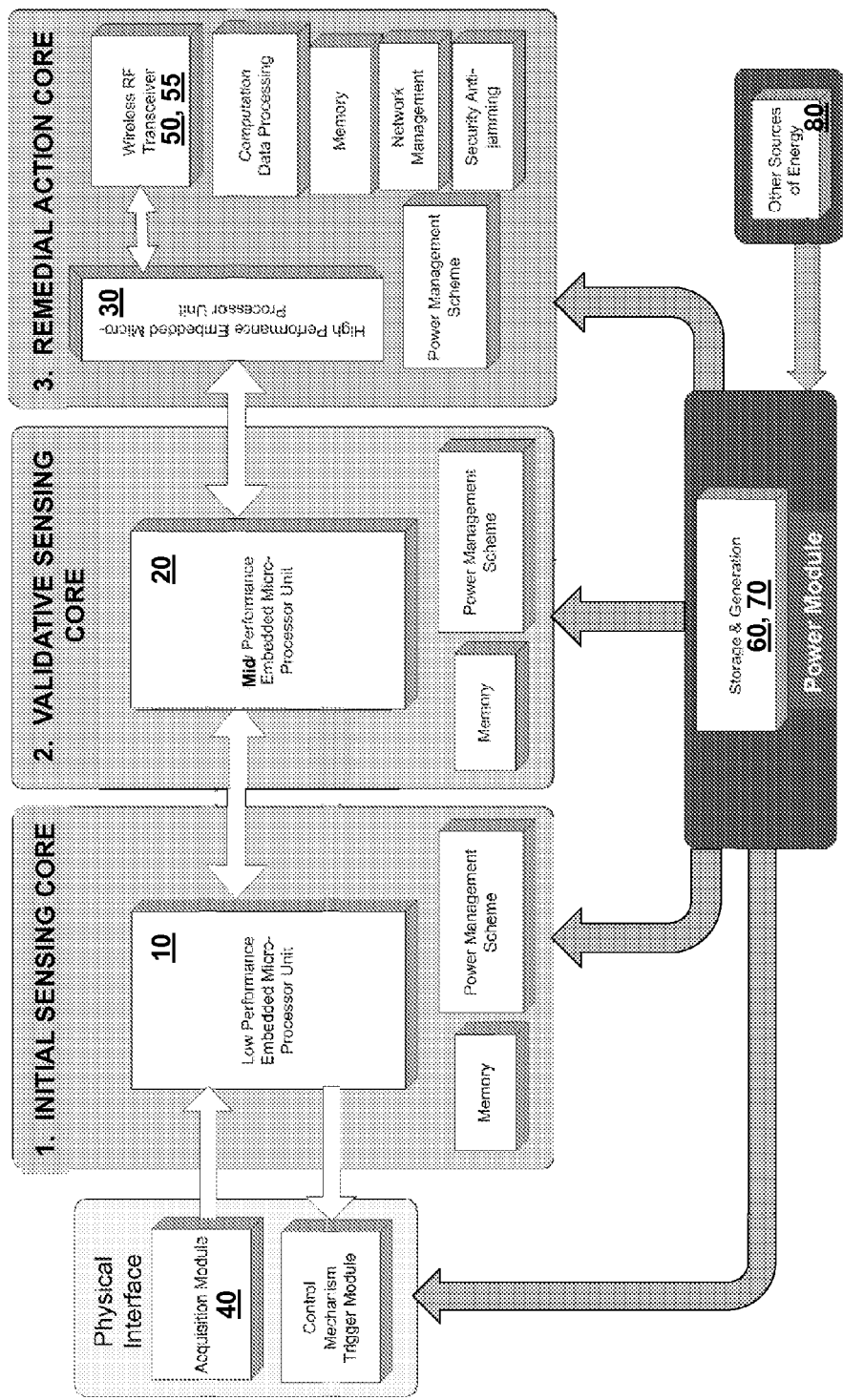
FIG. 3 is a diagram illustrative of structural and functional aspects, such as shown in FIG. 1 and FIG. 2, of typical practice of the present invention.

Referring now to the figures, the present invention's autonomous sensing unit 90 includes low-level computer 10 (which includes microprocessor 11 and memory 12), mid-level computer 20 (which includes microprocessor 21 and memory 22), high-level computer 30 (which includes microprocessor 31 and memory 32), one or more sensors 40, a radio frequency (RF) transceiver 50 (which includes an RF receiver 51 and an RF transmitter 52), an energy/power storage device (such as a supercapacitor) 60, "primary" energy/power harvester apparatus (such as an array of power harvesters) 70, and "auxiliary" energy/power harvester apparatus 80.

Depending on the inventive application, sensing devices 40 can measure any of a variety of physical parameters such as position, motion, temperature, chemical, infrared, image spectrum, etc. Parts/components/circuits of sensors 40 should be selected (such as CMOS ICs) to promote reduction of energy consumption. Radio frequency (RF) transceiver 50 for many inventive embodiments is preferably a low-power, short-transmit-range transceiver using a system-on-chip design. According to frequent inventive practice, RF transceiver 50 supports a software protocol that enables a wireless mesh network with ad hoc routing capability. Wireless ad hoc mesh networks support network reconfiguration in static, dynamic, or hybrid communication modes.

The machinery automation and control environment is replete with wasted/unused energy such as from thermal, vibration, and/or light sources. Primary energy harvester 70 and auxiliary energy harvester 80 can implement current energy harvesting technologies in order to power various elements of inventive sensor device 90. It is a fundamental challenge for wireless sensor networks to supply each wireless sensor node with sufficient power without connecting to a wired power supply, and without introducing excessive battery or other maintenance requirements. According to typical inventive practice, an energy storage unit 60 (e.g., a capacitor, such as a supercapacitor) is needed. For some inventive embodiments, an advanced technology battery may be used as a power option in addition to or in lieu of energy harvesting and storage.

Inventive sensor node unit 90 is equipped with three processor/controller systems ordered in terms of increasing computational intelligence, viz., low-level computer 10, mid-level computer 20, and high-level computer 30. Generally speaking, a higher performance processor consumes more power than a lower performance processor.

Low-level computer 10 performs routine sensing functions (referred to herein as "initial" sensing functions). Mid-level computer 20 performs sensing functions (referred to herein as "validative" sensing functions) that are somewhat more sophisticated than the initial sensing functions performed by low-level computer 10. High-level computer 30 performs functions (referred to herein as "high computation" or "remedial action"), including communicative functions, that are significantly more sophisticated than the validative sensing functions performed by mid-level computer 20. The present invention thus establishes a hierarchy of three computers, according to which the processing takes place in three stages.

The first stage involves routine sensory monitoring, presided over by low-level computer 10. During the first-stage processing, the first-stage computer (viz., low-level computer 10) is in "active mode" (synonymously referred to herein as "active state"); meanwhile, the second-stage computer (viz., mid-level computer 20) and the third-stage computer (viz., high-level computer 30) each remain in "sleep mode" (synonymously referred to herein as "sleep state"). The first-stage computer (viz., low-level computer 10) processes signals received from sensor(s) 40 to determine whether any value has been measured that constitutes a threshold value triggering the second stage. Otherwise expressed, low-level computer 10 establishes values, or ranges of values, of "normal" versus "abnormal" data sent by sensor(s) 40.

An abnormal sensory reading indicates a damage event or other exigent situation, such as a fire). For example, let us assume that a sensor 40 measures heat (temperature). Low-level computer 10 may have resident, in the non-volatile section of its memory 12, a relatively simple algorithmic software that sets a threshold of at least 110° F. for commencing the second stage, that is, for activating mid-level computer 20. Hence, if low-level computer 10 determines that a 110° F. or greater temperature has been measured by sensor 40, low-level computer 10 awakens mid-level computer 20, thus commencing the second stage.

The second stage involves validative sensory monitoring, presided over by mid-level computer 20. During the second-stage processing, the third-stage computer (viz., high-level computer 30) remains in "sleep mode." According to some inventive embodiments, low-level computer 10 remains in active mode during the second stage; however, according to other inventive embodiments, low-level computer 10 transforms from active mode to sleep mode at the beginning of the second stage, thereby joining high-level computer 30 in sleep mode. The return of low-level computer 10 to sleep mode may be prompted by either mid-level computer 20 or by low-level computer 10 itself. Mid-level computer 20 processes signals received from sensor(s) 40 to determine whether the determination by low-level computer 10 of an abnormal condition is valid. Validation by mid-level computer 20 can be performed in various ways, depending on the inventive embodiment. For instance, mid-level computer may repeat measurements taken by sensor(s) 40 over a period of time, in order to ensure that the measurement noted by low-level computer 10 is not an anomalous one.

Revisiting the example in which a sensor 40 measures thermal temperature, mid-level computer 20 may have resident, in the non-volatile section of its memory 22, an algorithmic software (slightly more complicated than the algorithmic software resident in low-level computer 10's memory 12) that prescribes a repetition of temperature measurements over a period of time, e.g., five seconds. If the abnormal temperature reading is sustained over that period of time, this suggests that the initial temperature abnormality determination, via the first stage, is valid. If the abnormal temperature reading returns to normal over that period of time, this suggests that the initial temperature abnormality determination, via the first stage, is invalid (anomalous), e.g., attributable to a transient/fleeting (and presumably harmless) temperature increase. If second-stage processing validates the abnormal condition, then the third stage is commenced, that is, high-level computer 30 is activated.

Thus, to begin the third stage, mid-level computer 20 awakens high-level computer 30. Since the abnormal condition has been validated, high-computation functionality is demanded. The third stage is presided over by high-level computer 30, and typically involves communication related to (e.g., responsive to) the previously validated abnormal condition. In the context of a wireless sensor network, high-level computer may determine what information to transmit, to whom to transmit the information, and how to route the wireless transmission of the information. For instance, continuing the example of an abnormally high temperature, high-level computer 30 may cause transceiver 50 to transmit communication as source node to another wireless sensor as destination node, such communication directing activation of a water sprinkler (e.g., via opening of a water sprinkler valve).

During the third-stage processing, various approaches may be taken in inventive practice as to whether either or both of low-level computer 10 and mid-level computer 20 remain in an active state. Depending on the inventive embodiment, at the beginning of the third stage, neither or either or both of low-level computer 10 and mid-level computer 20 may transform from active mode to sleep mode. For instance, high-level computer 30 may prompt the change from active state to sleep state in either or both of low-level computer 10 and mid-level computer 20. Or, for instance, mid-level computer 20 may prompt its own change from active state to sleep state.

Inventive practice may provide for wireless communication (e.g., transmitting and receiving) of "wake-up" radio signals between different sensor nodes 90, such as via transceivers 50 shown in FIG. 1. According to some inventive embodiments, a second RF transceiver is included in sensor node 90, such as "over-the-air-interrupt transceiver" 55 shown in FIG. 1. The over-the-air-interrupt transceivers 55 are used for the specific purpose of wirelessly communicating "wake-up" signals between different sensor nodes 90. Each over-the-air-interrupt transceiver 55 includes an RF receiver 56 and an RF transmitter 57, preferably requires minimal power, and can either wirelessly transmit or wirelessly receive signals that awaken a device or device component from sleep mode.

The present invention's three-stage, three-processor strategy for sensing and communicating is particularly effective when availing itself of energy harvesting, thereby making complete the autonomous quality of an inventive wireless sensor 90. Some inventive embodiments utilize exclusively a single energy harvester and storage of energy therefrom. Thus, as shown in FIG. 1, primary energy harvester 70 feeds power to power storage device 60, which in turn provides power for each of inventive sensor node 90's main elements, viz., low-level computer 10, mid-level computer 20, high-level computer 30, sensors(s) 40, and transceiver 50.

As shown in FIG. 1 by way of alternative, according to some inventive embodiments primary energy harvester 70 is supplemented by an auxiliary energy harvester 80, under predetermined circumstances. For instance, in the afore-discussed example of an abnormally high temperature, the extreme heat that is generated by a fire may, paradoxically, be taken advantage of for providing a quick burst of energy by auxiliary energy harvester 80, which harvests energy from the ambient heat generated by the fire. Auxiliary energy harvester 80 can feed energy storage device 60 so as to quickly and incrementally increase its energy supply, and which in turn can power third-stage functions including processing by high-level computer 30 and radio frequency communication by transceiver 50 (e.g., wireless transmission by transmitter 52).

The present invention, which is disclosed herein, is not to be limited by the embodiments described or illustrated herein, which are given by way of example and not of limitation. Other embodiments of the present invention will be apparent to those skilled in the art from consideration of the instant disclosure or from practice of the present invention. Various omissions, modifications, and changes to the principles disclosed herein may be made by one skilled in the art without departing from the true scope and spirit of the present invention, which is indicated by the following claims.

What is claimed is:

1. An autonomous sensing unit suitable for use in wireless communication, the device comprising:
   at least one temperature sensor;
   a radio frequency transmitter;
   a primary energy harvester;
   an auxiliary energy harvester, for harvesting thermal energy;
   an energy storage device, for storing energy harvested by said primary energy harvester and said auxiliary energy harvester, the stored said energy being available for powering components of said autonomous sensing unit including said at least one temperature sensor, said radio frequency transmitter, a first computer, a second computer, and a third computer;
   said first computer, for processing initial sensing performed by said at least one temperature sensor, said first computer configured to execute computer program logic that, when executed, establishes an initial sensory temperature data delimitation, informs said second computer upon initial indication by said at least one temperature sensor that an abnormally high temperature condition exists, and transforms said first computer from an active state to a sleep state upon informing said second computer of the initially indicated said abnormally high temperature condition, said initial sensory temperature data delimitation including a threshold temperature for initially indicating said abnormally high temperature condition, said second computer and said third computer each being in a sleep state while said first computer is in an active state;

said second computer, for processing validative sensing performed by said at least one temperature sensor, said second computer configured to execute computer program logic that, when executed, establishes a validative sensory temperature data delimitation, transforms said second computer from a sleep state to an active state upon being informed by said first computer of said initial indication of said abnormally high temperature condition, informs said third computer upon validation by said second computer that said abnormally high temperature condition exists, and transforms said second computer from an active state to a sleep state upon informing said third computer of the validated said abnormally high temperature condition, said validative sensory temperature data delimitation including a threshold duration for validating said abnormally high temperature condition, said first computer and said third computer each being in a sleep state while said second computer is in an active state; and said third computer, for processing in furtherance of action remedial of the validated said abnormally high temperature condition, said action including communication with at least one entity other than said autonomous sensing unit, said third computer configured to execute computer program logic that, when executed, establishes communicative procedure using said radio frequency transmitter, transforms said third computer from a sleep state to an active state upon being informed by said second computer of the validated said abnormally high temperature condition, and causes said radio frequency transmitter to transmit, to said at least one entity, information that is related to the validated said abnormally high temperature condition, said first computer and said second computer each being in a sleep state while said third computer is in an active state;

wherein said abnormally high temperature condition results in an incremental increase in thermal energy harvested by said auxiliary energy harvester, said energy storage device thereby being characterized by an incremental increase in the stored said energy available for powering said third computer and said radio frequency transmitter while said third computer is in an active state.

2. The autonomous sensing unit of claim 1 further comprising a radio frequency receiver, wherein the stored said energy is available for powering said radio frequency receiver.

3. A method for sensing and communicating in a power-managed manner, the method comprising implementation of a first computer, a second computer, a third computer, at least one temperature sensor, a wireless transmitter, a primary energy harvester, and an auxiliary energy harvester, wherein:

use of said first computer includes establishing an initial sensory temperature data delimitation, receiving sensory temperature data from at least one said temperature sensor, and, upon initial indication that an abnormally high temperature condition exists, changing said first computer from an active state to a sleep state and informing said second computer of the initially indicated said abnormally high temperature condition, said initial sensory temperature data delimitation including a threshold temperature for initially indicating said abnormally high temperature condition, said second computer and said third computer each being in a sleep state while said first computer is in an active state;

use of said second computer includes establishing a validative sensory temperature data delimitation, receiving sensory data from at least one said temperature sensor, and, upon validation that an abnormally high temperature condition exists, changing said second computer from an active state to a sleep state and informing said third computer of the validated said abnormally high temperature condition, said validative sensory temperature data delimitation including a threshold duration for validating said abnormally high temperature condition, said first computer and said third computer each being in a sleep state while said second computer is in an active state;

use of said third computer includes causing wireless transmission, by said wireless transmitter to at least one separate entity, of information relating to the validated said abnormally high temperature condition, said first computer and said second computer each being in a sleep state while said third computer is in an active state;

use of said energy storage device includes storing energy harvested by said primary energy harvester and said auxiliary energy harvester, said auxiliary energy harvester being capable of harvesting thermal energy, wherein the stored said energy harvested by said primary energy harvester and said auxiliary energy harvester is available for powering said at least one temperature sensor, said wireless transmitter, said first computer, said second computer, and said third computer, and wherein said abnormally high temperature condition results in an incremental increase in thermal energy harvested by said auxiliary energy harvester, said energy storage device thereby being characterized by an incremental increase in the stored said energy available for powering said third computer and said radio frequency transmitter while said third computer is in an active state.

4. The method of claim 3, wherein
said wireless transmission is radio transmission.

5. A computer program product comprising a non-transitory computer readable storage medium having a computer readable program stored thereon for execution by at least three computers to perform a method for sensing and communicating in a power-managed manner, each computer executing a portion of the computer readable program, the method including implementation of a low-level computer, a mid-level computer, a high-level computer, at least one temperature sensor, a wireless transmitter, a primary energy harvester, and an auxiliary energy harvester, wherein:

use of said low-level computer includes establishing an initial sensory temperature data delimitation, receiving sensory temperature data from at least one said temperature sensor, and, upon initial indication that an abnormally high temperature condition exists, changing said low-level computer from an active state to a sleep state and informing said mid-level computer of the initially indicated said abnormally high temperature condition, said initial sensory temperature data delimitation including a threshold temperature for initially indicating said abnormally high temperature condition, said mid-level computer and said high-level computer each being in a sleep state while said low-level computer is in an active state;

use of said mid-level computer includes establishing a validative sensory temperature data delimitation, receiving sensory data from at least one said temperature sensor, and, upon validation that an abnormally high temperature condition exists, changing said mid-level computer from an active state to a sleep state and informing said high-level computer of the validated said abnormally high temperature condition, said validative sensory temperature data delimitation including a threshold duration for validating said abnormally high temperature condition, said low-level computer and said high-level computer each being in a sleep state while said mid-level computer is in an active state;

use of said high-level computer includes causing wireless transmission, by said wireless transmitter to at least one separate entity, of information relating to the validated said abnormally high temperature condition, said low-level computer and said mid-level computer each being in a sleep state while said high-level computer is in an active state;

use of said energy storage device includes storing energy harvested by said primary energy harvester and said auxiliary energy harvester, said auxiliary energy harvester being capable of harvesting thermal energy, wherein the stored said energy harvested by said primary energy harvester and said auxiliary energy harvester is available for powering said at least one temperature sensor, said wireless transmitter, said low-level computer, said mid-level computer, and said high-level computer, and wherein said abnormally high temperature condition results in an incremental increase in thermal energy harvested by said auxiliary energy harvester, said energy storage device thereby being characterized by an incremental increase in the stored said energy available for powering said high-level computer and said wireless transmitter while said high-level computer is in an active state.

6. The computer program product of claim 5, wherein:
said wireless transmission is radio transmission.

* * * * *